(12) United States Patent
Choi et al.

(10) Patent No.: US 11,288,534 B2
(45) Date of Patent: Mar. 29, 2022

(54) APPARATUS AND METHOD FOR IMAGE PROCESSING FOR MACHINE LEARNING

(71) Applicant: SAMSUNG SDS CO., LTD., Seoul (KR)

(72) Inventors: Jong-Won Choi, Seoul (KR); Young-Joon Choi, Seoul (KR); Ji-Hoon Kim, Seoul (KR); Byoung-Jip Kim, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 275 days.

(21) Appl. No.: 16/782,352

(22) Filed: Feb. 5, 2020

(65) Prior Publication Data

US 2020/0372280 A1 Nov. 26, 2020

Related U.S. Application Data

(60) Provisional application No. 62/853,080, filed on May 27, 2019.

(30) Foreign Application Priority Data

May 23, 2019 (KR) .................. 10-2019-0060863

(51) Int. Cl.
  *G06K 9/46* (2006.01)
  *G06N 20/00* (2019.01)
  *G06K 9/62* (2022.01)
  *G06N 3/08* (2006.01)

(52) U.S. Cl.
  CPC ........... *G06K 9/4604* (2013.01); *G06K 9/626* (2013.01); *G06K 9/6276* (2013.01); *G06N 3/08* (2013.01); *G06N 20/00* (2019.01)

(58) Field of Classification Search
  CPC .... G06K 9/4604; G06K 9/626; G06K 9/6276; G06N 20/00; G06N 3/08
  See application file for complete search history.

(56) References Cited

U.S. PATENT DOCUMENTS

| | | | |
|---|---|---|---|
| 2015/0206315 A1* | 7/2015 | Price | G06T 7/162 382/180 |
| 2019/0012790 A1* | 1/2019 | Aoba | G06K 9/6231 |
| 2019/0043242 A1* | 2/2019 | Risser | G06T 11/001 |
| 2019/0258878 A1* | 8/2019 | Koivisto | G06N 3/084 |
| 2019/0332942 A1* | 10/2019 | Wang | G06K 9/6267 |
| 2019/0355119 A1* | 11/2019 | Hu | G06N 3/08 |

FOREIGN PATENT DOCUMENTS

KR  10-2018-0004898 A  1/2018

* cited by examiner

*Primary Examiner* — Fayyaz Alam
(74) *Attorney, Agent, or Firm* — The PL Law Group, PLLC

(57) ABSTRACT

An image processing apparatus includes a superpixel extractor configured to extract a plurality of superpixels from an input original image, a backbone network including N feature extracting layers (here, N is a natural number of two or more) which divide the input original image into grids including a plurality of regions and generate an output value including a feature value for each of the divided regions, and a superpixel pooling layer configured to generate a superpixel feature value corresponding to each of the plurality of superpixels using a first output value to an $N^{th}$ output value output from each of the N feature extracting layers.

20 Claims, 8 Drawing Sheets

SUPERPIXEL

APPARATUS AND METHOD FOR IMAGE PROCESSING FOR MACHINE LEARNING

CROSS-REFERENCE TO RELATED APPLICATION

This application claims the benefit of U.S. Provisional Patent Application No. 62/853,080 filed on May 27, 2019 and the benefit of Korean Patent Application No. 10-2019-0060863, filed on May 23, 2019, the disclosures of which are incorporated herein by reference for all purposes.

BACKGROUND

1. Field

Embodiments of the present disclosure relate to an image processing technique for recognition and classification of image data using machine learning.

2. Discussion of Related Art

In recent years, machine learning, especially deep learning, has been expanding its application in various fields, such as voice recognition, image recognition, natural language processing, and the like. In particular, recognition and classification of image data is one field in which deep learning is being most actively utilized, and various analysis models and algorithms are being studied.

In order to recognize multiple objects in units of regions in an image in which various objects coexist, most of the existing deep learning algorithms attempt to classify the objects in units of pixels of the image. However, with the performance improvement of cameras, quality of images is also improved, and thus an amount of data to be processed is too much increased when objects are classified in units of pixels. In order to address the above problem, an attempt has recently been made to classify objects on the basis of a superpixel formed by grouping similar pixels. However, in many cases, a size of a superpixel is smaller than a size of a grid divided in a neural network, and thus the case occurs in which a plurality of superpixels are included in one grid. In this case, it is difficult to grasp a feature value of each of the superpixels.

SUMMARY

Embodiments of the present disclosure are intended to provide technical means for improving the efficiency and accuracy of deep learning based image classification using a superpixel formed by grouping pixels with a high similarity among pixels constituting image data.

According to an aspect of the present disclosure, there is an image processing apparatus including a superpixel extractor configured to extract a plurality of superpixels from an input original image, a backbone network including N feature extracting layers (here, N is a natural number of two or more) which divide the input original image into grids including a plurality of regions and generate an output value including a feature value for each of the divided regions, and a superpixel pooling layer configured to generate a superpixel feature value corresponding to each of the plurality of superpixels using a first output value to an $N^{th}$ output value output from each of the N feature extracting layers.

An $n^{th}$ feature extracting layer (n is a natural number satisfying $1<n<=N$) of the backbone network may be configured to receive an $(n-1)^{th}$ output value generated from an $(n-1)^{th}$ feature extracting layer and generate an $n^{th}$ feature value from the $(n-1)^{th}$ output value.

When a specific superpixel of the plurality of superpixels is included in any one region of a plurality of regions in a grid corresponding to an $m^{th}$ output value (m is a natural number satisfying $1<=m<=N$), the superpixel pooling layer may set an $m^{th}$ feature value of the region that includes the specific superpixel as an $m^{th}$ superpixel feature value of the specific superpixel.

When a specific superpixel of the plurality of superpixels is included in two or more regions of a plurality of regions in a grid corresponding to an $m^{th}$ output value, the superpixel pooling layer may set a representative value of $m^{th}$ feature values of a region that includes the specific superpixel as an $m^{th}$ superpixel feature value of the specific superpixel.

The representative value may be any one of an average value and an intermediate value of the $m^{th}$ feature values of the region that includes the specific superpixel.

The representative value may be calculated in consideration of the $m^{th}$ feature values of the region that includes the specific superpixel and a size of the specific superpixel in the region that includes the specific superpixel.

The superpixel pooling layer may set a value obtained by concatenating the $m^{th}$ superpixel feature values from a first to an $N^{th}$ order as a superpixel feature value of the specific superpixel.

The image processing apparatus may further include a superpixel parameter recommendation part configured to determine an optimal superpixel parameter in consideration of features of the input original image.

The superpixel parameter may include one or more of a number, a size, or a shape degree of freedom of the extracted superpixels in the input original image.

The superpixel parameter recommendation part may perform learning on a plurality of learning images each classified into one or more classes and determine a superpixel parameter corresponding to the input original image using a learning result, wherein the learning may be performed so that a number of superpixels extracted within a range in which superpixels extracted from the learning images do not include two or more classes is minimized.

According to another aspect of the present disclosure, there is an image processing method including extracting a plurality of superpixels from an input original image, generating a first output value to an $N^{th}$ output value from the input original image using a backbone network including N feature extracting layers (here, N is a natural number of two or more) which divide the input original image into grids including a plurality of regions and generate an output value including a feature value for each of the divided regions, and generating a superpixel feature value corresponding to each of the plurality of superpixels using the first output value to the $N^{th}$ output value output from each of the N feature extracting layers.

An $n^{th}$ feature extracting layer (n is a natural number satisfying $1<n<=N$) of the backbone network may be configured to receive an $(n-1)^{th}$ output value generated from an $(n-1)^{th}$ feature extracting layer and generate an $n^{th}$ feature value from the $(n-1)^{th}$ output value.

When a specific superpixel of the plurality of superpixels is included in any one region of a plurality of regions in a grid corresponding to an $m^{th}$ output value (m is a natural number satisfying $1<=m<=N$), the generating of the superpixel feature value may include setting an $m^{th}$ feature value of the region that includes the specific superpixel as an $m^{th}$ superpixel feature value of the specific superpixel.

When a specific superpixel of the plurality of superpixels is included in two or more regions of a plurality of regions of a grid corresponding to the $m^{th}$ output value, the generating of the superpixel feature value may include setting a representative value of $m^{th}$ feature values of a region that includes the specific superpixel as an $m^{th}$ superpixel feature value of the specific superpixel.

The representative value may be any one of an average value and an intermediate value of the $m^{th}$ feature values of the region that includes the specific superpixel.

The representative value may be calculated in consideration of the $m^{th}$ feature values of the region that includes the specific superpixel and a size of the specific superpixel in the region that includes the specific superpixel.

The generating of the superpixel feature value may include setting a value obtained by concatenating the $m^{th}$ superpixel feature values from a first to an $N^{th}$ order as a superpixel feature value of the specific superpixel.

The method may further include determining an optimal superpixel parameter in consideration of features of the input original image before the extracting of the superpixels is performed.

The superpixel parameter may include one or more of a number, a size, or a shape degree of freedom of the extracted superpixels in the input original image.

The determining of the superpixel parameter may include performing learning on a plurality of learning images each classified into one or more classes and determining a superpixel parameter corresponding to the input original image using a learning result, wherein the learning may be performed so that a number of superpixels extracted within a range in which superpixels extracted from the learning images do not include two or more classes is minimized.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only exemplary, and the present disclosure is not limited thereto.

In describing embodiments of the present disclosure, when it is determined that a detailed description of known techniques associated with the present disclosure would unnecessarily obscure the subject matter of the present disclosure, the detailed description thereof will be omitted. Also, terms used herein are defined in consideration of the functions of the present disclosure and may be changed depending on a user, the intent of an operator, or a custom. Accordingly, the terms should be defined based on the following overall description of this specification. The terminology used herein is only for the purpose of describing embodiments of the present disclosure and is not restrictive. The singular forms preceded by "a," "an," and "the" are intended to include the plural forms as well, unless the context clearly indicates otherwise. It should be understood that the terms "comprises," "comprising," "includes," and/or "including," specify the presence of stated features, integers, steps, operations, elements, components, and/or groups thereof when used herein, but do not preclude the presence or addition of one or more other features, integers, steps, operations, elements, components, and/or groups thereof.

Figure 1:
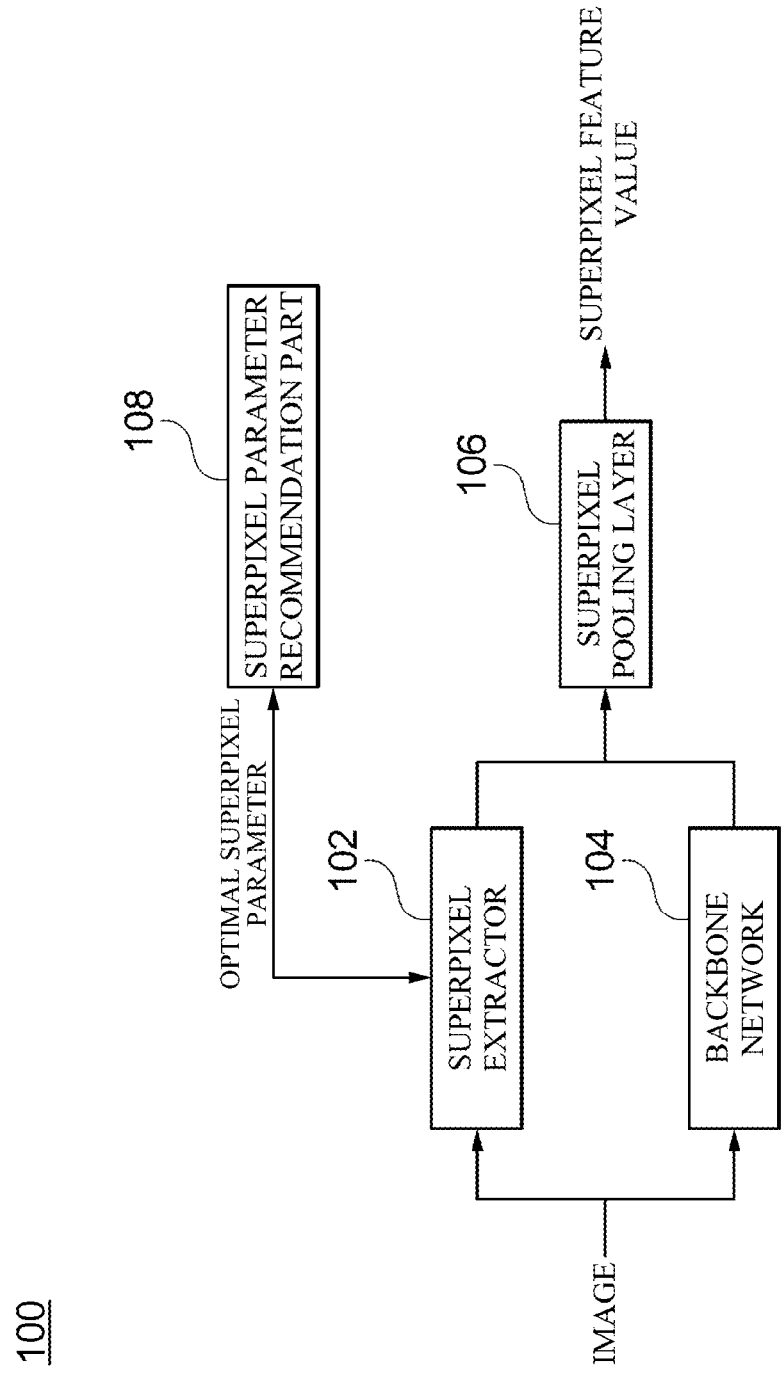
FIG. 1 is a block diagram for describing an image processing apparatus (100) according to an embodiment.

FIG. 1 is a block diagram for describing an image processing apparatus 100 according to an embodiment. The image processing apparatus 100 according to the embodiment is an apparatus for extracting a plurality of superpixels from an input original image and generating a feature value of each of the extracted superpixels. The generated feature value of each superpixel may then be used to recognize and classify the input original image using machine learning. As illustrated in FIG. 1, the image processing apparatus 100 according to the embodiment includes a superpixel extractor 102, a backbone network 104, and a superpixel pooling layer 106.

The superpixel extractor 102 extracts a plurality of superpixels from the input original image. In embodiments of the present disclosure, a superpixel refers to a pixel group in which pixels with a high similarity among pixels constituting the input original image are bundled together to form one large chunk.

Figure 2:
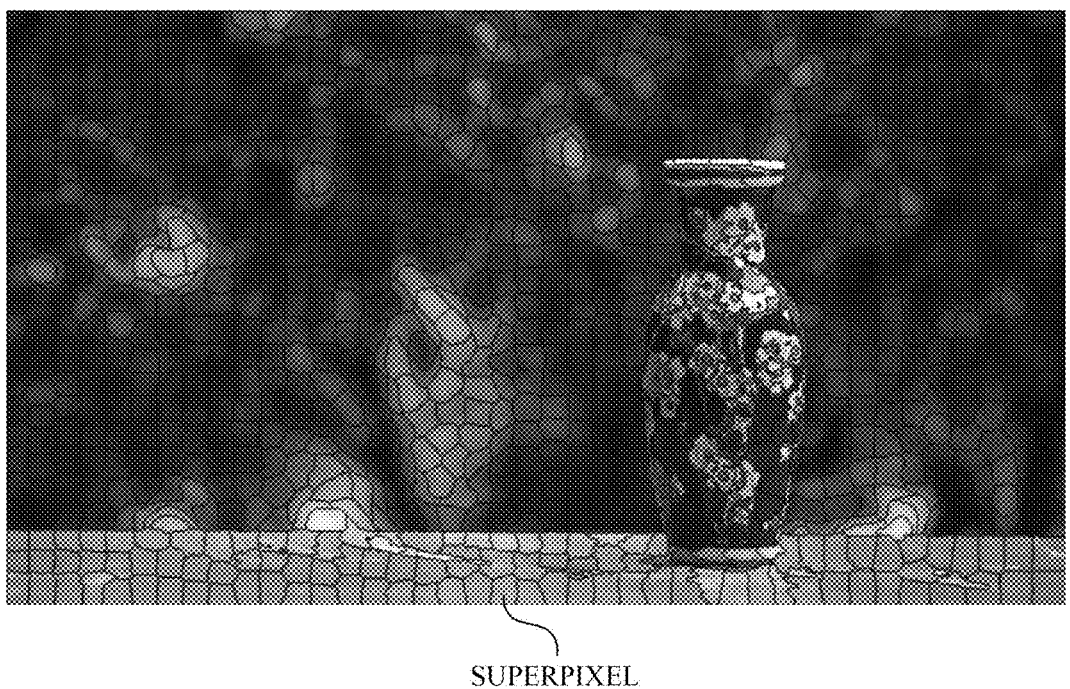
FIG. 2 is a diagram of an example in which an input original image is divided into a plurality of superpixels in a superpixel extractor (102) according to an embodiment.

FIG. 2 is a diagram of an example in which the input original image is divided into the plurality of superpixels in the superpixel extractor 102 according to the embodiment. As illustrated in the drawing, each of the superpixels may be extracted according to the similarity of the pixels constituting the input original image. In addition, the superpixels may have a free shape according to features of the input original image rather than having the same shape.

The backbone network 104 extracts one or more feature values from the input original image. In the embodiments of the present disclosure, the backbone network 104 is configured to have a pyramid structure that includes a plurality (N, here, N is a natural number of two or more) of feature extracting layers. In this case, each of the feature extracting layers is configured to divide the input original image into grids including a plurality of regions and generate an output value including the feature value for each divided region. In addition, each of the plurality of feature extracting layers constituting the backbone network 104 may be configured to receive an output value of a feature extracting layer in a preceding stage and generate its own output value form the received output value. In other words, an $n^{th}$ feature extracting layer (n is a natural number satisfying $1<n<=N$) of the backbone network 104 may be configured to receive an $(n-1)^{th}$ output value generated from an $(n-1)^{th}$ feature extracting layer and generate an $n^{th}$ feature value from the received $(n-1)^{th}$ output value.

In an embodiment, each of the feature extracting layers constituting the backbone network 104 may include one or more convolution layers and a pooling layer. In this case, the output value of each feature extracting layer may be configured as an output value of the pooling layer, that is, a feature value for each of regions obtained by dividing the input original image in the form of grid. A resolution of the input original image is lowered as the input original image passes through each of the feature extracting layers of the backbone network 104, and accordingly, a size of the grid of each of the output values is increased. That is, when the backbone network 104 includes N feature extracting layers, a size of a grid of an output value of a first feature extracting layer located at a first stage is the smallest and a size of a grid of an output value of an $N^{th}$ feature extracting layer is the largest.

The superpixel pooling layer 106 uses the first output value to the $N^{th}$ output value which are output from the N feature extracting layers constituting the backbone network 104 to generate a superpixel feature value corresponding to each of the plurality of superpixels.

The output values output from the backbone network 104 are configured in the form of grid, whereas the superpixels extracted from the superpixel extractor 102 have a free shape. Therefore, it is impossible to generate the feature value for each of the superpixels by directly applying the output values of the backbone network 104 to the superpixels. In addition, since a size of a grid of a final output value of the backbone network 104 is mostly greater than the size of the superpixel, the plurality of superpixels may be included in the same grid. In this case, a phenomenon occurs in which all the superpixels in the same grid have the same feature value. In order to address the above problem, the superpixel pooling layer 106 is configured to generate the feature value for each superpixel by applying separate superpixel pooling. In addition, the superpixel pooling layer 106 is configured to use all the output values of the feature extracting layers constituting the backbone network 104 as well as a final result of the backbone network 104 with a low resolution so that each of the superpixels has a unique feature value.

Figure 3:
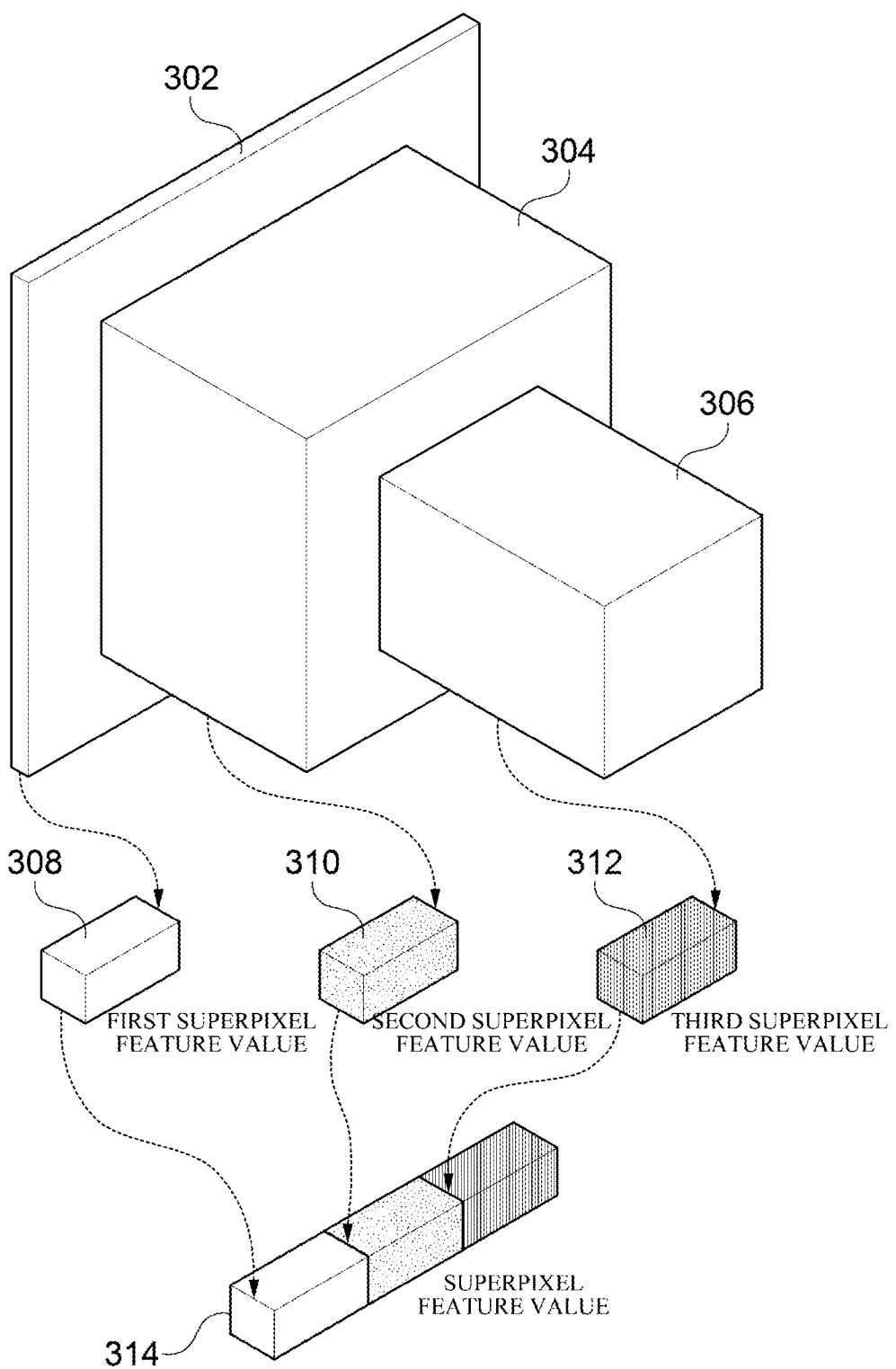
FIG. 3 is a diagram for describing an example in which a feature value of each of superpixels is calculated in a superpixel pooling layer (106) according to an embodiment.

FIG. 3 is a diagram for describing an example in which the feature value of each of the superpixels is calculated in the superpixel pooling layer 106 according to the embodiment. The illustrated embodiment shows an example in which the backbone network 104 includes three feature extracting layers. However, this is exemplary, and the embodiments of the present disclosure are not limited to a specific number of feature extracting layers.

In the embodiment illustrated in FIG. 3, the superpixel pooling layer 106 may generate a first superpixel feature value 308 of each superpixel from an output value 302 of a first feature extracting layer, generate a second superpixel feature value 310 from an output value 304 of a second feature extracting layer, and generate a third superpixel feature value 312 from an output value 306 of a third feature extracting layer. Thereafter, when the first superpixel feature value, the second superpixel feature value, and the third superpixel feature value are concatenated, the feature value of each superpixel is generated.

That is, the superpixel pooling layer 106 may set a value, which is obtained by concatenating the $m^{th}$ superpixel feature values from a first to an $N^{th}$ order, as a superpixel feature value corresponding to a specific superpixel.

Figure 4:
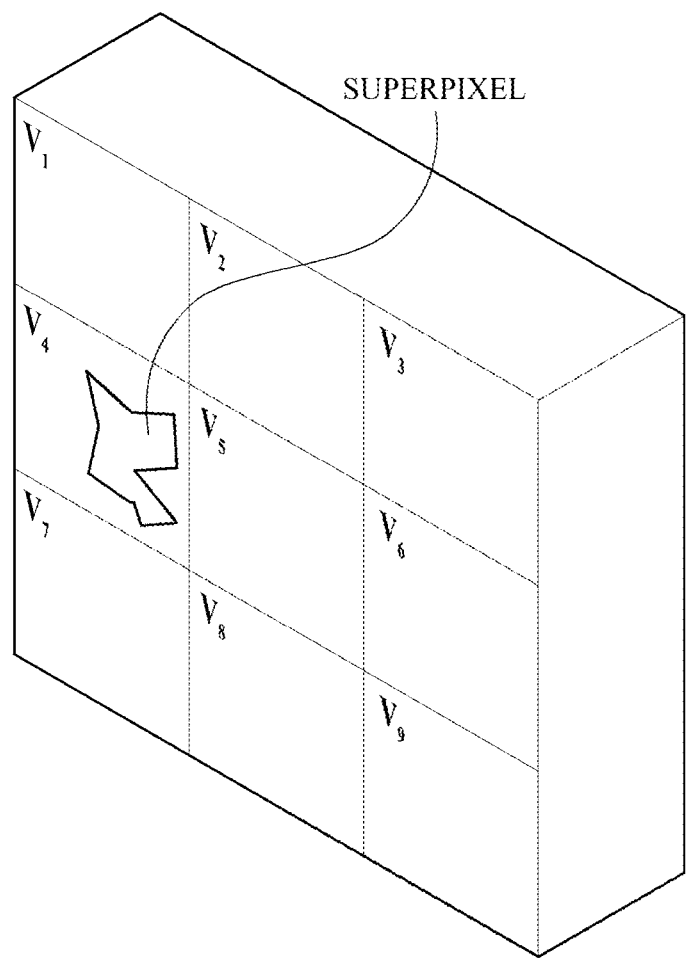
FIGS. 4 and 5 are diagrams of examples for describing superpixel pooling for generating superpixel feature values in a superpixel pooling layer (106) according to an embodiment.
Figure 5:
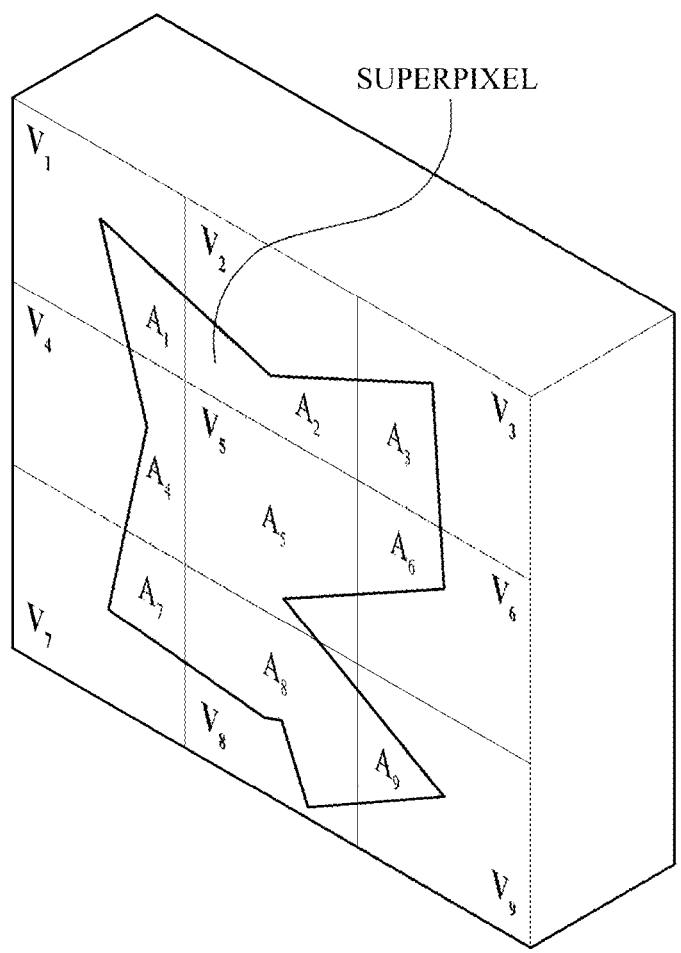

FIGS. 4 and 5 are diagrams of examples for describing superpixel pooling for generating superpixel feature values in the superpixel pooling layer 106 according to the embodiment. In the embodiments illustrated in FIGS. 4 and 5, $v_1$ to $v_9$ denote $m^{th}$ output values output from an $m^{th}$ feature extracting layer (m is a natural number satisfying $1<=m<=N$) of the backbone network 104. In the illustrated embodiment, it is assumed that the $m^{th}$ output values have a form of a grid divided into nine regions. In this case, $v_1$ to $v_9$ each denote a feature value for each region of the grid.

As illustrated in FIG. 4, when a specific superpixel is included in any one region of the plurality of regions in the grid corresponding to the $m^{th}$ output value, the superpixel pooling layer 106 sets an $m^{th}$ feature value of a region that includes the specific superpixel as an $m^{th}$ superpixel feature value of the specific superpixel. In FIG. 4, the $m^{th}$ superpixel feature value of the specific superpixel illustrated becomes $v_4$.

As illustrated in FIG. 5, when the specific superpixel is included in two or more regions of the plurality of regions in the grid corresponding to the $m^{th}$ output value, the superpixel pooling layer 106 may set a representative value of $m^{th}$ feature values of a region that includes a specific superpixel as an $m^{th}$ superpixel feature value of the specific superpixel. For example, the representative value may be any one of an average value and an intermediate value of the $m^{th}$ feature values of the region that includes the specific superpixel. In FIG. 5, the representative value of the specific superpixel illustrated may be any one of an average value and an intermediate value of vi to v9.

In an embodiment, the representative value may be calculated in consideration of the $m^{th}$ feature values of the region that includes the specific superpixel and a size of the specific superpixel in the region that includes the specific superpixel. When it is assumed that the sizes of the superpixels illustrated in FIG. 5 in each grid are $A_1$ to $A_9$, respectively, the feature value of the corresponding superpixel may be calculated by Equation 1 below.

$$v_m = \frac{1}{A}\sum_{i=1}^{k} v_i \times A_i \quad \text{[Equation 1]}$$

In the above Equation 1, $v_m$ denotes the $m^{th}$ feature value of the superpixel, A denotes the size of the superpixel, k denotes the number of grids that overlap the superpixel, $v_i$ denotes a feature value of an $i^{th}$ grid that overlaps the superpixel, and $A_i$ denotes the size of the superpixel in the $i^{th}$ grid.

Through the above process, the superpixel pooling layer 106 may obtain a superpixel feature value for each of the superpixels extracted by the superpixel extractor 102. The obtained superpixel feature value may be used as an input value (an input feature) of a classifier (not illustrated) for classifying superpixels. The classifier may classify and label the superpixels using various classification models such as a neural network, a support-vector machine (SVM) classifier, a linear classifier, and the like. Thereafter, a classification result of each superpixel is assigned to each pixel included in the corresponding superpixel so that a final image classification result is obtained.

Meanwhile, the image processing apparatus 100 according to the embodiment may further include a superpixel parameter recommendation part 108 configured to determine an optimal superpixel parameter in consideration of the features of the input original image. In this case, the superpixel extractor 102 may extract the superpixels according to the parameter determined by the superpixel parameter recommendation part 108. For example, a large number of superpixels is advantageous for high accuracy for complex images, whereas a small number of superpixels is advantageous for rapid calculation for relatively simple images. Accordingly, the superpixel parameter recommendation part 108 may measure complexity of the input original image and calculate the optimal number of superpixels using the complexity. The superpixel parameter may include one or more of a number, a size, or a shape degree of freedom of the superpixels extracted from the input original image.

In an embodiment, the superpixel parameter recommendation part 108 may be configured to determine a superpixel parameter optimized for an input original image using a neural network (a superpixel proposal network). For example, the neural network may adjust the superpixel parameter so that the number of superpixels is increased as the input original image becomes more complex but the number of superpixels is reduced as the input original image becomes simpler.

Figure 6:
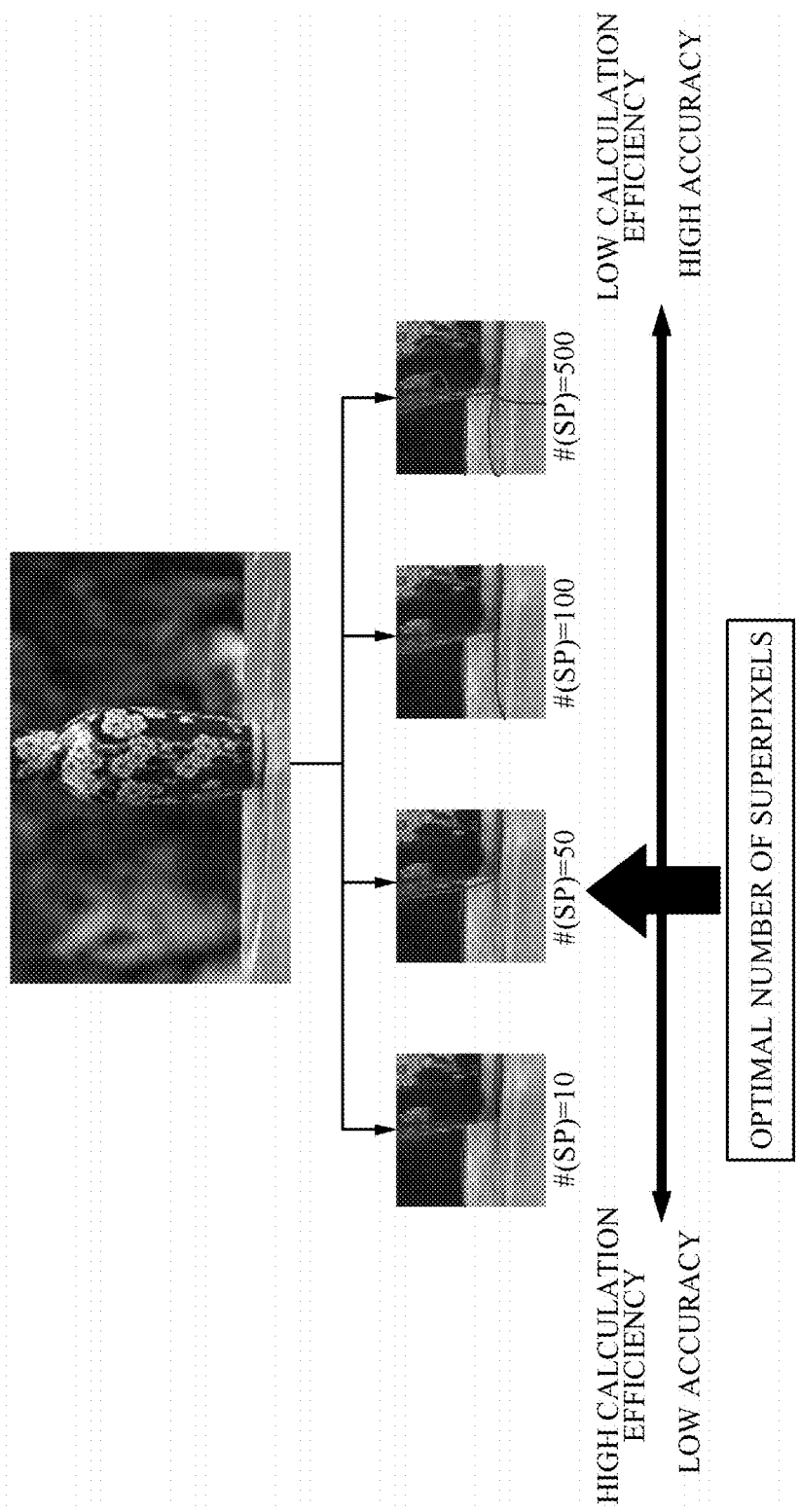
FIG. 6 is a diagram of an example for describing a process of determining an optimal superpixel parameter according to an embodiment.

FIG. 6 is a diagram of an example for describing a process of determining an optimal superpixel parameter in the superpixel parameter recommendation part 108 according to an embodiment.

In order to determine the optimal superpixel parameter, it is necessary to perform learning on a neural network in the superpixel parameter recommendation part 108. In an embodiment, the superpixel parameter recommendation part 108 may perform learning on a plurality of learning images each classified into one or more classes and determine a superpixel parameter corresponding to the input original image using the learning result. In this case, the learning may be performed so that the number of superpixels which are extracted within a range in which the superpixels extracted from the learning image do not include two or more classes is minimized. A more detailed description thereof is as follows.

In an initial operation, the neural network is initialized so as to extract the superpixels according to an initially set superpixel parameter regardless of what image is input. For the learning image, it is assumed that there is a ground truth (GT) image in which the corresponding image is divided into class regions. For example, the image illustrated in FIG. 2 may be divided into three classes including a vase, bushes in the background, and a table surface on which the vase is placed.

When such a learning image is input to the neural network, the neural network first determines a superpixel parameter (e.g., the number of superpixels) from the learning image. In this case, when the number of generated superpixels is so small that a superpixel including two or more class regions among the extracted superpixels is present, the corresponding superpixel should be divided into two or more different superpixels. Therefore, in this case, the neural network is learned so that the superpixel extractor 102 outputs a larger number of superpixels. On the other hand, when the number of generated superpixels is so large that several adjacent superpixels are all divided into the same class region, it is efficient in terms of computational efficiency for two or more superpixels to be concatenated into one superpixel. Therefore, in this case, the neural network is learned so that the superpixel extractor 102 outputs a smaller number of superpixels. Mean squared error (MSE), maximum likelihood estimation (MLE), logistic regression, or the like may be used as a loss function used for learning the neural network. That is, the neural network for recommending the number of superpixels may perform learning so that only as few superpixels are generated as possible within a limit of the superpixels belonging to one class in consideration of both accuracy of the classification and efficiency of the calculation.

Referring to FIG. 6, it can be seen that when the number of superpixels is less than 50, for example, ten, the vase and the background are extracted as one superpixel, and when the number of superpixels is 100 or 500, pixels of the vase or the table surface, which belong to the same class, are divided into different superpixels. Therefore, in this case, the optimal number of superpixels becomes 50. By repeating the above learning process for a plurality of images, the superpixel parameter recommendation part 108 may output the optimal number of superpixel parameters with respect to the input original image.

Figure 7:
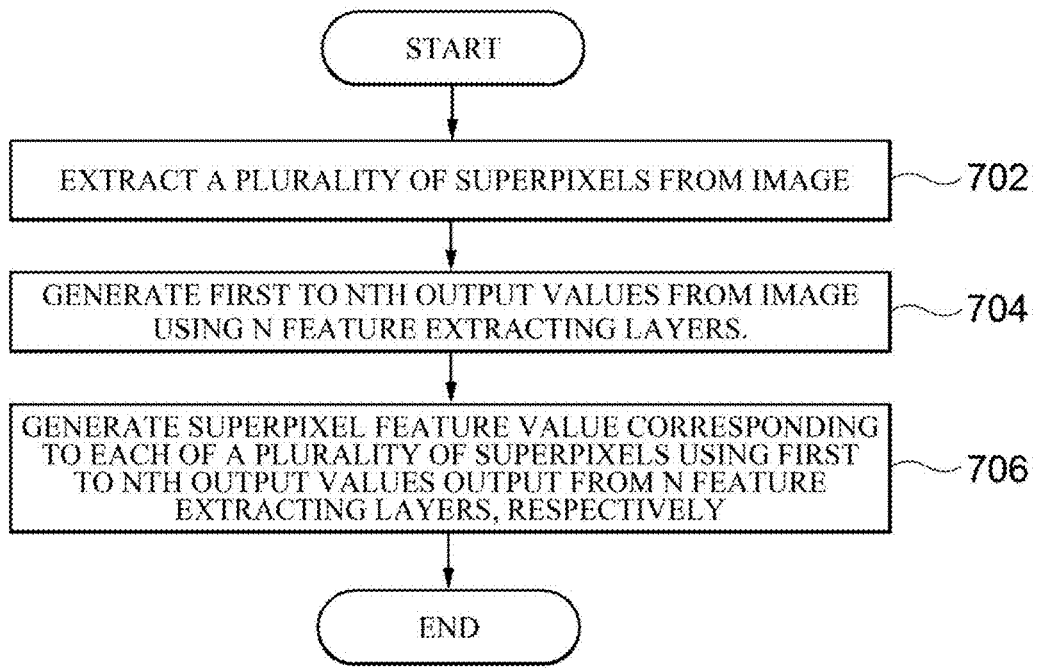
FIG. 7 is a flowchart for describing an image processing method (700) according to an embodiment.

FIG. 7 is a flowchart for describing an image processing method 700 according to an embodiment. The illustrated flowchart may be performed by a computing device, for example, the image processing apparatus 100 described above, including one or more processors and a memory configured to store one or more programs executed by the one or more processors. In the illustrated flowchart, the method or process is described as being divided into a plurality of operations. However, at least some operations may be performed in reverse order, may be performed in combination with another operation, may be omitted, may be performed by being subdivided into sub-operations, or may be performed by adding one or more operations which are not illustrated.

In operation 702, the superpixel extractor 102 extracts a plurality of superpixels from an input original image.

In operation 704, the backbone network 104 generates a first output value to an $N^{th}$ output value from the input original image using N feature extracting layers. In this case, each of the feature extracting layers is configured to divide the input original image into a grid including a plurality of regions and generate an output value including a feature value for each divided region.

In operation 706, the superpixel pooling layer 106 generates a superpixel feature value corresponding to each of the plurality of superpixels using the first output value to the $N^{th}$ output value output from the N feature extracting layers, respectively.

Figure 8:
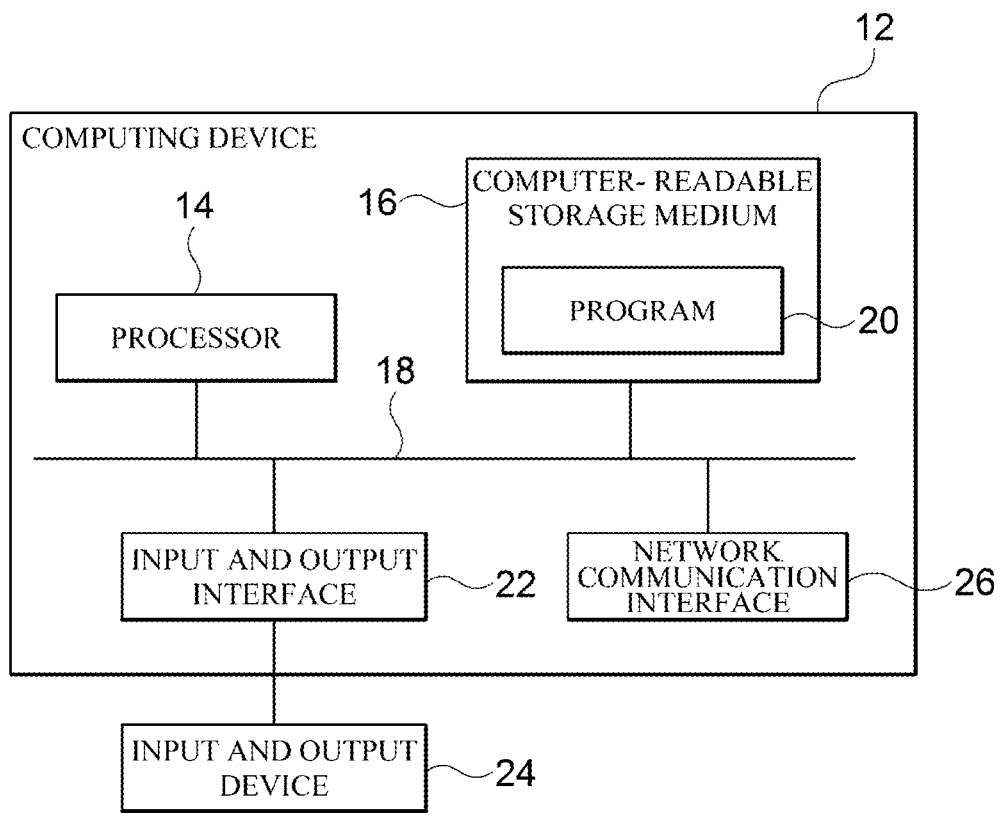
FIG. 8 is a block diagram for illustrating and describing a computing environment (10) that includes a computing device appropriate for use in exemplary embodiments.

FIG. 8 is a block diagram for illustrating and describing a computing environment 10 that includes a computing device appropriate for use in exemplary embodiments. In the illustrated embodiment, components may have different functions and capabilities in addition to those described below, and additional components in addition to those described below may be provided.

The illustrated computing environment 10 includes a computing device 12. In an embodiment, the computing device 12 may be the image classification apparatus 100 according to the embodiments of the present disclosure. The computing device 12 includes at least one processor 14, a computer-readable storage medium 16, and a communication bus 18. The processor 14 may allow the computing device 12 to operate according to the exemplary embodiments described above. For example, the processor 14 may execute one or more programs stored in the computer-readable storage medium 16. The one or more programs may include one or more computer executable instructions, and the computer executable instructions may be configured to allow the computing device 12 to perform the operations according to the exemplary embodiments when being executed by the processor 14.

The computer-readable storage medium 16 is configured to store computer executable instructions and program codes, program data, and/or other appropriate forms of information. A program 20 stored in the computer-readable storage medium 16 includes a set of instructions executable by the processor 14. In an embodiment, the computer-readable storage medium 16 may include memories (volatile memories such as random access memories (RAMs), non-volatile memories, or combinations thereof), one or more magnetic disk storage devices, optical disk storage devices, flash memory devices, other types of storage media accessed by the computing device 12 and capable of storing desired information, or appropriate combinations thereof.

The communication bus 18 connects various components of the computing device 12 to each other, including the processor 14 and the computer-readable storage medium 16.

The computing device 12 may further include one or more input and output interfaces 22 for providing an interface for one or more input and output devices 24 and one or more network communication interfaces 26. The input and output interfaces 22 and the network communication interfaces 26 are connected to the communication bus 18. The input and output device 24 may be connected to other components of the computing device 12 through the input and output interfaces 22. For example, the input and output devices 24 may include input devices, such as a pointing device (such as a mouse or trackpad), a keyboard, a touch input device (such as a touchpad or touchscreen), a voice or sound input device, various types of sensor devices, and/or imaging devices, and/or may include output devices, such as display devices, printers, speakers, and/or network cards. For example, the input and output device 24 may be included inside the computing device 12 as one component of the computing device 12 and may be connected to the computing device 12 as a separate device from the computing device 12.

According to the embodiments of the present disclosure, in deep learning based image classification using superpixels, feature values of the superpixels can be effectively derived using output values for each operation of a backbone network.

Further, according to the embodiments of the present disclosure, efficiency of image classification can be improved by varying a size or number of superpixels according to features of an input image.

Embodiments of the present disclosure may include a program for executing the method described herein on a computer and a computer-readable recording medium including the program. The computer-readable recording medium may include any one or a combination of program instructions, a local data file, a local data structure, etc. The medium may be designed and configured specifically for the present disclosure or may be generally available in the field of computer software. Examples of the computer-readable recording medium include a magnetic medium, such as a hard disk, a floppy disk, and a magnetic tape, an optical recording medium, such as a compact disc read only memory (CD-ROM) and a digital video disc (DVD), and a hardware device specially configured to store and execute a program instruction, such as a read only memory (ROM), a RAM, and a flash memory. Examples of the program instructions may include machine code generated by a compiler and high-level language code that can be executed in a computer using an interpreter.

Although example embodiments of the present disclosure have been described in detail, it should be understood by those skilled in the art that various changes may be made without departing from the spirit or scope of the present disclosure. Therefore, the scope of the present disclosure is to be determined by the following claims and their equivalents and is not restricted or limited by the foregoing detailed description.

What is claimed is:

1. An image processing apparatus comprising:
a superpixel extractor configured to extract a plurality of superpixels from an input original image;
a backbone network including N feature extracting layers which divide the input original image into grids including a plurality of regions and generate an output value including a feature value for each of the divided regions, where N is a natural number of two or more; and
a superpixel pooling layer configured to generate a superpixel feature value corresponding to each of the plurality of superpixels using a first output value to an $N^{th}$ output value output from each of the N feature extracting layers.

2. The image processing apparatus of claim 1, wherein an $n^{th}$ feature extracting layer of the backbone network is configured to receive an $(n-1)^{th}$ output value generated from an $(n-1)^{th}$ feature extracting layer and generate an $n^{th}$ feature value from the $(n-1)^{th}$ output value, where n is a natural number satisfying $1<n<=N$.

3. The image processing apparatus of claim 2, wherein, when a specific superpixel of the plurality of superpixels is included in any one region of a plurality of regions in a grid corresponding to an $m^{th}$ output value where m is a natural number satisfying $1<=m<=N$, the superpixel pooling layer sets an $m^{th}$ feature value of the region that includes the specific superpixel as an $m^{th}$ superpixel feature value of the specific superpixel.

4. The image processing apparatus of claim 2, wherein, when a specific superpixel of the plurality of superpixels is included in two or more regions of a plurality of regions in a grid corresponding to an $m^{th}$ output value, the superpixel pooling layer sets a representative value of $m^{th}$ feature values of a region that includes the specific superpixel as an $m^{th}$ superpixel feature value of the specific superpixel.

5. The image processing apparatus of claim 4, wherein the representative value is any one of an average value and an intermediate value of the $m^{th}$ feature values of the region that includes the specific superpixel.

6. The image processing apparatus of claim 4, wherein the representative value is calculated in consideration of the $m^{th}$ feature values of the region that includes the specific superpixel and a size of the specific superpixel in the region that includes the specific superpixel.

7. The image processing apparatus according to claim 3, wherein the superpixel pooling layer sets a value obtained by concatenating the $m^{th}$ superpixel feature values from a first to an $N^{th}$ order as a superpixel feature value of the specific superpixel.

8. The image processing apparatus of claim 1, further comprising a superpixel parameter recommendation part configured to determine an optimal superpixel parameter in consideration of features of the input original image.

9. The image processing apparatus of claim 8, wherein the superpixel parameter includes one or more of a number, a size, or a shape degree of freedom of the extracted superpixels in the input original image.

10. The image processing apparatus of claim 8, wherein the superpixel parameter recommendation part performs learning on a plurality of learning images each classified into one or more classes and determines a superpixel parameter corresponding to the input original image using a learning result; and the learning is performed so that a number of superpixels extracted within a range in which superpixels extracted from the learning images do not include two or more classes is minimized.

11. An image processing method comprising:

extracting a plurality of superpixels from an input original image;

generating a first output value to an $N^{th}$ output value from the input original image using a backbone network including N feature extracting layers which divide the input original image into grids including a plurality of regions and generate an output value including a feature value for each of the divided regions, where N is a natural number of two or more; and generating a superpixel feature value corresponding to each of the plurality of superpixels using the first output value to the $N^{th}$ output value output from each of the N feature extracting layers.

12. The image processing method of claim 11, wherein an $n^{th}$ feature extracting layer of the backbone network is configured to receive an $(n-1)^{th}$ output value generated from an $(n-1)^{th}$ feature extracting layer and generate an $n^{th}$ feature value from the $(n-1)^{th}$ output value, where n is a natural number satisfying $1<n<=N$.

13. The image processing method of claim 12, wherein, when a specific superpixel of the plurality of superpixels is included in any one region of a plurality of regions in a grid corresponding to an $m^{th}$ output value where m is a natural number satisfying $1<=m<=N$, the generating of the superpixel feature value includes setting an $m^{th}$ feature value of the region that includes the specific superpixel as an $m^{th}$ superpixel feature value of the specific superpixel.

14. The image processing method of claim 12, wherein, when a specific superpixel of the plurality of superpixels is included in two or more regions of a plurality of regions of a grid corresponding to an $m^{th}$ output value, the generating of the superpixel feature value includes setting a representative value of $m^{th}$ feature values of a region that includes the specific superpixel as an $m^{th}$ superpixel feature value of the specific superpixel.

15. The image processing method of claim 14, wherein the representative value is any one of an average value and an intermediate value of the $m^{th}$ feature values of the region that includes the specific superpixel.

16. The image processing method of claim 14, wherein the representative value is calculated in consideration of the $m^{th}$ feature values of the region that includes the specific superpixel and a size of the specific superpixel in the region that includes the specific superpixel.

17. The image processing method according to claim 13, wherein the generating of the superpixel feature value includes setting a value obtained by concatenating the $m^{th}$ superpixel feature values from a first to an $N^{th}$ order as a superpixel feature value of the specific superpixel.

18. The image processing method of claim 11, further comprising determining an optimal superpixel parameter in consideration of features of the input original image before the extracting of the superpixels is performed.

19. The image processing method of claim 18, wherein the superpixel parameter includes one or more of a number, a size, or a shape degree of freedom of the extracted superpixels in the input original image.

20. The image processing method of claim 18, wherein the determining of the superpixel parameter includes performing learning on a plurality of learning images each classified into one or more classes and determining a superpixel parameter corresponding to the input original image using a learning result; and the learning is performed so that a number of superpixels extracted within a range in which superpixels extracted from the learning images do not include two or more classes is minimized.

* * * * *